United States Patent [19]

Haddad

[11] 4,189,991

[45] Feb. 26, 1980

[54] PRESSURIZED FLUID SUPPLY AND CONTROL DEVICE, PARTICULARLY FOR COFFEE-MAKING MACHINES

[75] Inventor: Adrien Haddad, Neve-Avivim, Israel

[73] Assignee: Officine Cimbali Giuseppe S.p.A., Binasco, Italy

[21] Appl. No.: 895,997

[22] Filed: Apr. 13, 1978

[30] Foreign Application Priority Data

Apr. 18, 1977 [IT] Italy .................................. 22543 A77

[51] Int. Cl.$^2$ ............................................. A47J 31/34
[52] U.S. Cl. .................................................. 99/302 R
[58] Field of Search ............... 99/295, 302 R, 302 FB, 99/302 P, 303; 138/93, 90

[56] References Cited

U.S. PATENT DOCUMENTS

| | | | |
|---|---|---|---|
| 2,881,692 | 4/1959 | Volcov | 99/302 |
| 3,384,004 | 5/1968 | Perlman | 99/302 |
| 3,754,463 | 8/1973 | Vernooy | 99/302 |

*Primary Examiner*—Robert W. Jenkins
*Attorney, Agent, or Firm*—Lewis H. Eslinger

[57] ABSTRACT

Pressurized fluid supply and control device, for coffee-making machines, comprising an arrangement for generating and supplying a fluid under pressure, control members to allow the fluid to flow intermittently, a bowl containing a charge of powdered material, particularly ground coffee, and adapted to receive the fluid, and a control group effective to hold the bowl closed tight when the fluid under pressure is being supplied, and conversely to connect the bowl to the surrounding atmosphere when the fluid is not being supplied to the bowl to provide a number of alternate supply and venting cycles for the bowl. The control group comprises an elastic pocket to the inside whereof the pressurized fluid is fed. The elastic pocket is inserted in the bowl in the proximity of a top opening of the bowl.

9 Claims, 7 Drawing Figures

PRESSURIZED FLUID SUPPLY AND CONTROL DEVICE, PARTICULARLY FOR COFFEE-MAKING MACHINES

BACKGROUND OF THE INVENTION

This invention relates to a supply and control device for fluids, e.g. water, under pressure, particularly for use on coffee-making machines and infusion preparing machines in general, but not limited thereto.

As is known, the most critical fluid supply and control conditions are encountered in coffee-making, and more generally infusion-making, machines where any errors in the amount, temperature, and pressure of the fluid supplied immediately reflect in poor machines' performance. Specially critical and important are those devices in such coffee-making machines which inject an amount of water, in predetermined physical conditions, through a charge of coffee or like product which has been ground and loaded into a percolator or "filter".

Two basic types of such devices are currently known, namely a first type wherein water is gravity fed to the coffee charge, and a second type wherein water is pressure forced through the same charge. The latter type is quite advantageous over the former as regards speed of operation, since the pressurized water takes little time to pass through the ground coffee, whereas the non-pressurized water drips through at a very slow rate. However, the pressurized water system has the disadvantage of compacting by pressure action the ground coffee charge to the point of rendering the extraction of coffee oils and essences a difficult and incomplete process. Moreover, the compacting action slows down the hot water flow to a certain extent, thus reducing the advantages afforded by pressure percolation. This behavior is particularly evident in the case of coffee which has been ground into particles of minimal size: in this case, application of excessively high pressure to the coffee powder causes such a high compression of the same that output of liquid coffee from the filter is almost prevented. Specifically, the following phenomenon takes place: initially, by applying pressure water to the coffee powder bed, there is produced a relatively smooth flow of liquid through the coffee charge itself, with attendant extraction of coffee essences, but then the pressure load onto the coffee powder progressively reduces the latter volume, bringing about a concurrent reduction in the percolating water flow as well as in the essence and oil extraction capabilities of the water. Furthermore, as soon as pressure is released, the coffee mass, which is provided with a certain elasticity, expands back at least in part to its former position.

Because of the above-outlined situation, there arises the technical problem of designing a novel pressurized fluid supply and control device, particularly for coffee-making machines, which can overcome the aforementioned difficulties by providing a controlled supply of fluid under pressure, this control capability being more particularly related to fluid temperature, pressure and volume or amount, such as to ensure, for example, a quick and effective percolation of liquid through a powder material, regardless of its particle size.

SUMMARY OF THE INVENTION

This invention is directed to solving the above technical problem.

Within the scope of such a general aim, it is an object of this invention to provide a device as indicated which is of particularly simple construction and suitable for mass production techniques.

Another object of this invention is to provide a device as indicated which is capable of operating automatically, and benefits from the inclusion of ancillary members effective to ensure correct operation of said device in any circumstances.

These objects are achieved by a pressurized fluid supply and control device, particularly for coffee-making machines, according to this invention, characterized in that it comprises: supply means for a fluid under pressure; members operative to allow said fluid to flow out intermittently; a bowl adapted to receive said fluid; and control means effective to hold said bowl closed tight when said fluid under pressure is being supplied, and conversely to connect said bowl to the surrounding atmosphere when said fluid is not being supplied to said bowl.

BRIEF DESCRIPTION OF THE DRAWINGS

Further features and advantages will be apparent from the following description of preferred but not limitative embodiments of the invention, illustrated by way of example only in the accompanying drawings, where.

DESCRIPTION OF THE PREFERRED EMBODIMENTS

Figure 1:
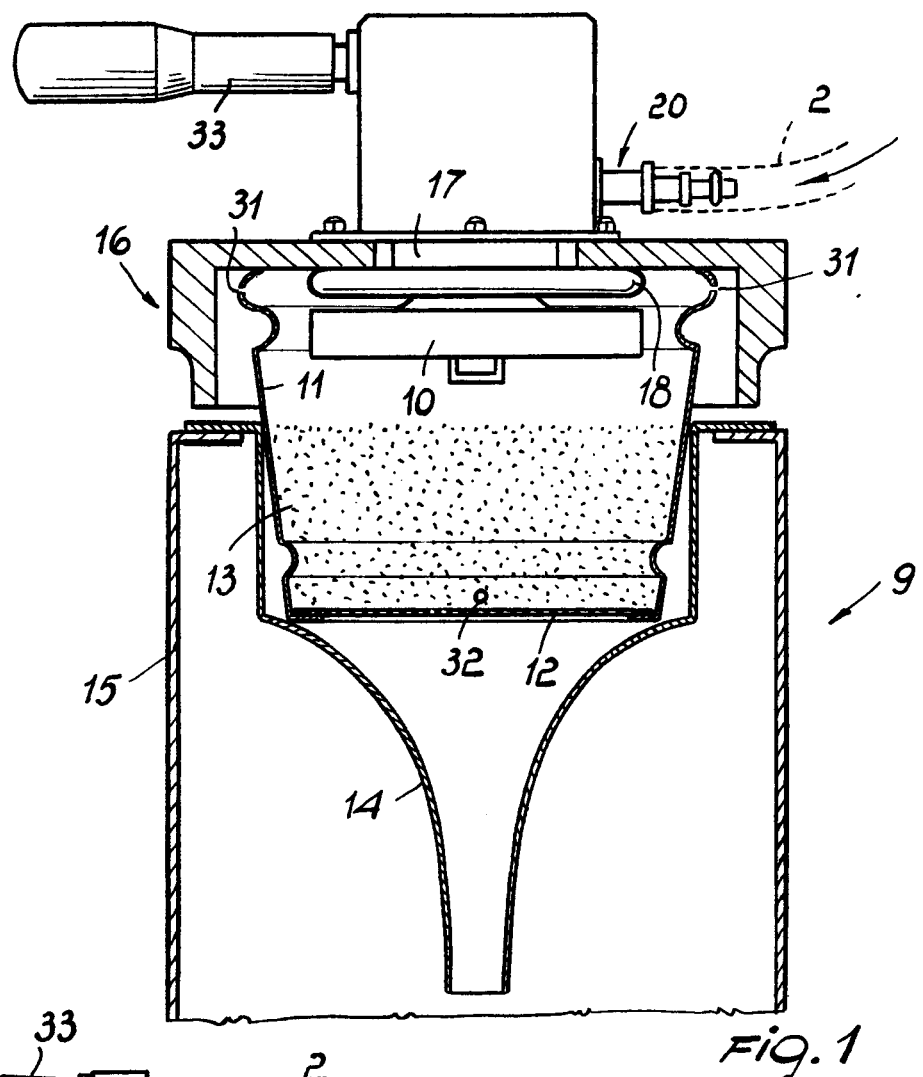
FIG. 1 is a schematic view of a device according to this invention, shown only partially.

With reference to FIGS. 1 to 4, showing a first embodiment of the invention, the supply and control device according to this invention, which in the example shown is applied to a coffee-making machine, comprises among others means, indicated generally at 1, for generating a pressurized liquid, in the instant case water, and to feed it at a high temperature to a duct 2. More specifically, the supply means 1 comprise a small boiler 3 suitable to heat the water from a pipe 4 which may be directly connected to the water supply mains. A pressure stabilizer 5 is inserted in the pipe 4 which, for example, ensures a supply of water at a pressure of 1,2 atmospheres to the boiler 3. In the boiler 3, the liquid is heated to a temperature close to, but not exceeding, the boiling point, and owing to this heating the liquid reaches a pressure level of almost 2 atmospheres. A thermostat 6 is provided to control the water temperature in the proximity of the inlet of the supply duct or line 2. Advantageously, provision is made for the inclusion, within the pipe 4 close to its inlet into the boiler 3, and in the supply duct 2 close to the outlet of the boiler 3, of members operative to allow the pressurized water to flow intermittently for a given number of times, as will appear hereinafter, such members comprising two solenoid valves 7 the opening and closing whereof is controlled synchronously by the thermostat 6. The thermostat 6 is also connected to an electric resistor 8 defining heating means for the water in the boiler 3. Advantageously, provision is made for the electric resistor 8 to be turned on simultaneously with the closing of the solenoid valves 7, and conversely to be turned off when such valves are opened. The thermostat 6, known per se, is so set as to become operative to open the solenoid valves 7 when the detected temperature is of approximately 90° C., and close the solenoid valves when the temperature drops to about 85° C. These temperature levels are merely exemplary.

The supply duct 2 defines means for supplying the pressurized liquid to a percolation assembly 9, better visible in FIG. 1. In this percolation assembly 9, the pressurized hot water is directed, through a spout 10, into a vessel or bowl 11 having a percolator or "filter" 12 at its bottom, whereon a charge of coffee or the like 13 is placed which is formed by a layer of powdered material. The bowl 11 is inserted with its bottom in a funnel 14 ending in a container 15 where the resulting liquid coffee is collected. The bowl 11 has at the top at least one opening and, located at that opening, the device includes control means adapted to hold the bowl air-tight closed during the supply of the pressurized liquid and for venting the bowl to atmosphere when the supply of pressurized liquid ceases. Specifically, it may be observed that the bowl 11 supports at the top a cap 16, not closed to a tight fit, with which there are engaged, with the interposition of a supporting block 17 affixed to the cap, an elastic pocket 18 and an injector assembly 19 partly inserted in the spout 10 over the ground coffee charge 13.

Still more specifically, it may be observed (FIGS. 1 and 3) that the supply duct 2 terminates at a check valve 20 rigid with the supporting block 17 and communicating with a canalization 21 inside the injector assembly 19. The latter includes, along the path followed by said canalization, and sequentially in the direction of advance of the liquid under pressure, first nozzles 22 and, successively, second nozzles 23, both of which serve to discharge the pressurized water from the canalization 21, which is closed by a plug 24.

The first nozzles 22 open at a radially perforated distributor disk 25 such as to direct the pressurized water into the elastic pocket 18, and particularly at the area of said pocket which is closer to the outer circumferential edge thereof. The distributor disk 25, being clamped at two opposite sides between the injector assembly 19 and the support block 17, with the interposition of the elastic pocket 18, prevents the pressurized water from leaking past the central cavity of the elastic pocket 18, wherein the injector assembly 19 is inserted coaxially. The tight sealing action between the elastic pocket 18 and supporting block 17 and box-like body of the spout 10, on the pocket outside, and between the pocket and distributor disk 25 therewithin, is obviously obtained, additionally to the mutual clamping of such components, also with the interposition of elastic O-ring seals, not shown in the drawings for clarity.

The injector assembly 19 includes, in alignment with the portion inserted in the supporting block 17 and the portion inserted in the elastic pocket 18, a further portion embedded in the box-like body of the spout 10 and equipped with said second nozzles 23.

However, it is contemplated that in the canalization 21, within the injector assembly 19, valve means be included which comprise a control valve 26 operative to intercept the pressurized water flow to the second nozzles 23 which are arranged downstream of the valve 26, when the elastic pocket 18 is deflated and a high pressure is formed inside the bowl 11.

In fact, the control valve 26 is constructed such as to shut off the canalization 21 under the action of a compression spring 27 acting in counterflow relationship to the flow of pressurized water and so calibrated as to admit hot water only when the latter has a pressure of about two atmospheres. Moreover, it is important to observe that the control valve 26 opposes the flow of pressurized hot water, not only by virtue of the compression spring 27 but also on account of any pressure exerted by the water present in the bowl 11, which acts on the valve surfaces opposite the sealing one and against the water flow from the supply duct 2.

The hot water under pressure exiting the second nozzles 23 occupies the inner volume of the box-like body of the spout 10 and percolates into the bowl 11 where the coffee charge 13 is present, through a screen 28 clamped centrally between the injector assembly 19 and a nut member 29 which is threaded onto a portion of the injector assembly 19 projecting beyond the spout 10.

It should be noted that the bowl 11 has, close to its upper opening, a contoured peripheral portion 30 which is rounded such as to have its cavity facing the inside of the bowl, at the level of the elastic pocket 18. Should the bowl opening not be air-tight closed by the cap 16, there would be provided through the contoured portion 30 bleeding holes 31 or openings to allow venting of the bowl. Further bleeding apertures, of small diameter, are formed at that portion of the bowl lateral surface which is closest to the filter 12. FIG. 1 shows one of such bleeding apertures, indicated at 32.

Figure 2:
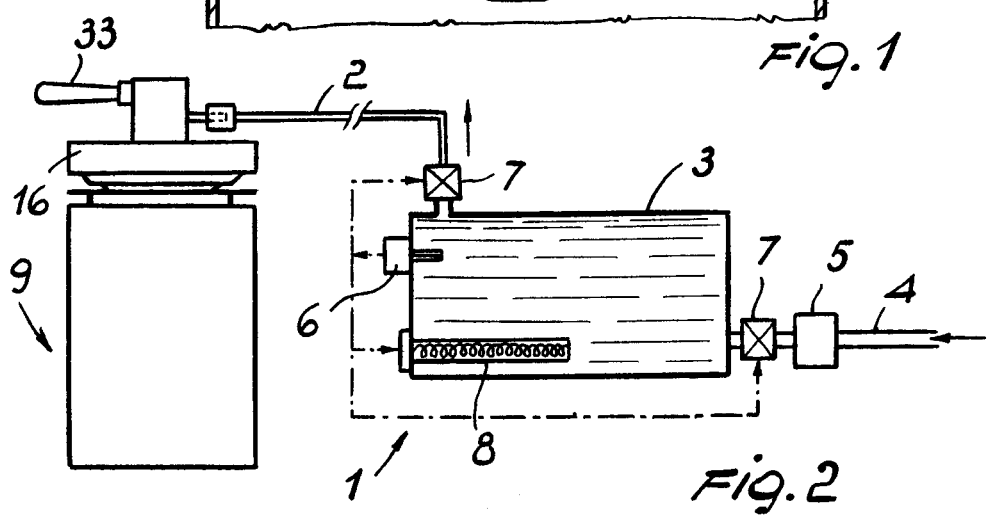
FIG. 2 shows, at a reduced scale, the inventive device complete with the pressurized fluid generating and supply members.
Figure 3:
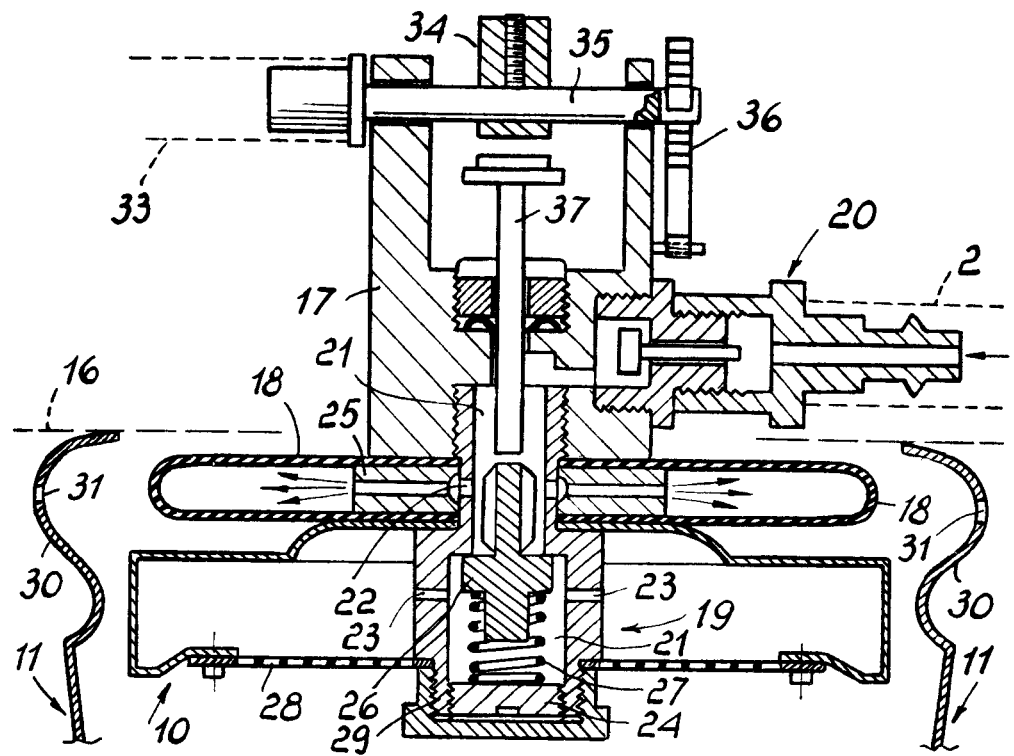
FIGS. 3 and 4 show a portion of FIG. 1 in section and enlarged scale, the instant device being represented respectively in two operative positions.

FIGS. 1 and 2 also show a handle or grip 33 arranged above the cap 16 and connected to an auxiliary discharge device biassing the control valve 26. This auxiliary device comprises a cam 34 rigid with a shaft 35 which is coaxial to and engages with the handle or grip 33, as well as pivotable onto the supporting block 17. The end of the shaft 35 opposite to the handle 33 is associated to a coil spring 36, retained at one end by the same block 17. The cam 34, as it rotates together with the shaft 35, interferes with a punch member 37 which goes through the supporting block 17 until it is inserted coaxially into the injector assembly 19, adjacently the control valve 26.

The above-described supply and control device operates as follows.

The water is heated in the boiler 3, when the solenoid valves 7 are closed, and concurrently therewith, raised to a higher pressure owing to its being heated in a sealed environment. As the thermostat 6 detects a sufficiently high temperature, it simultaneously controls the opening of the two solenoid valves 7 and the turning off of the electric resistor 8. The hot water under pressure flows then through the supply duct 2 and check valve 20 to the inside of the percolating assembly 9. In particular, the pressurized hot water enters the canalization 21 and the inner space of the elastic pocket 18, because the control valve 26 prevents the water from flowing out through the second nozzles 23. The elastic pocket 18 expands until it adheres to the contoured portion 30 of the bowl 11, which stops any further expansion thereof, and closes the opening (s) 31. The hot water, therefore, is enabled to exert a pressure force onto the control valve 26 such as to overcome the resistance of the compression spring 27 and flow through the second nozzles 23 into the spout 10, whence it flows through the charge 13 of ground coffee. The closure effected by the elastic pocket 18 ensures a pressure action of the hot water in the bowl 11. The resulting liquid coffee flows through the percolator or filter 12 into the funnel 14 and hence into the container 15. The funnel creates a sort of local jet stream in the container 15, with attendant stirring of the coffee which builds up in the same container, instead of forming layers with the denser portion of the coffee at the bottom. The funnel 14, which contributes to the closing of the container 15, also prevents the coffee aroma from being dispersed from the container 15.

Figure 4:
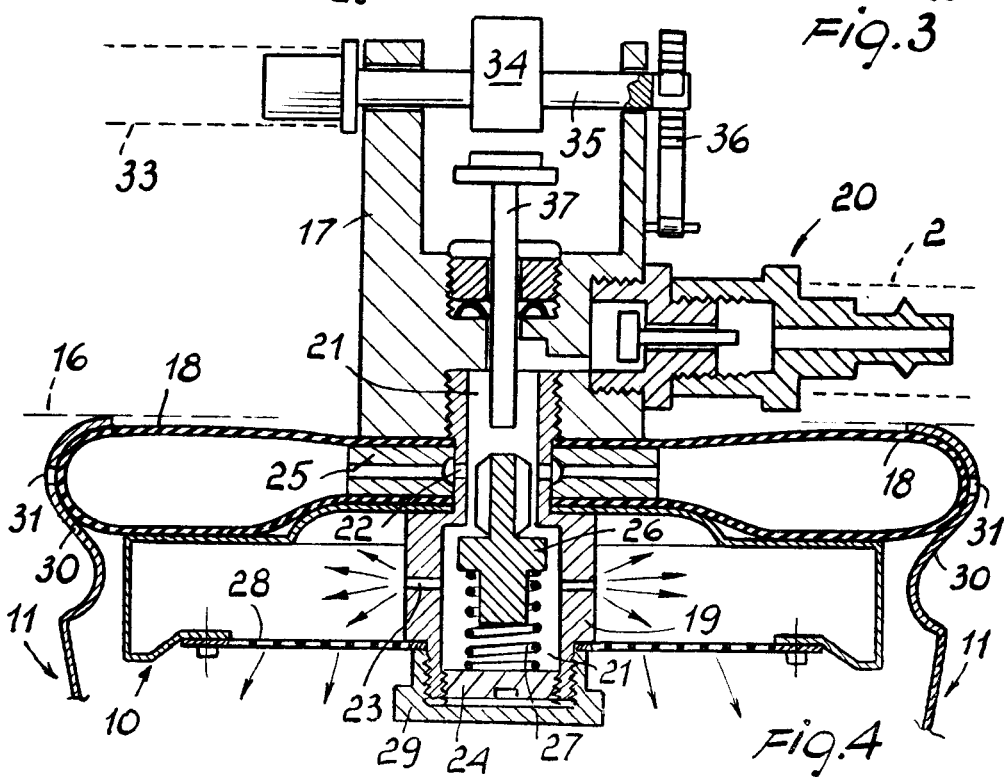

The stage of expansion of the elastic pocket 18 and sealed closure of the bowl 11, with consequent flow of hot water under pressure through the spout 10, which stage is illustrated in FIG. 4, lasts as long as hot water under pressure flows out of the boiler 3. But as, owing to renewed delivery, the temperature of the water in the boiler, as detected by the thermostat 6, drops down, the thermostat itself controls the closing of the solenoid valves 7 and the turning once again on of the electric resistor 8. The pressurized hot water flow to the percolating assembly 9 is then shut off. The elastic pocket 18 tends now to return to the position of FIG. 3, and the control valve 26 intercepts, by virtue of the compression spring 27, the flow of the liquid through the second nozzles 23. All this causes a sharp drop of pressure within the bowl 11, thanks particularly to the presence of bleeding holes 31 in the contoured portion 30 of the bowl 11, which are uncovered by the elastic pocket contracting. The coffee charge 13, formerly squeezed and compressed against the percolator 12, is now enabled to resume its original position, by expansion and aeration: those interspaces are again created among the coffee particles which the pressure applied by the liquid from the spout 10 tended to fill, whereby the liquid passage and complete extraction of the coffee essence were hindered. It is clear that a quantity of water remains on the coffee charge 13 and progressively percolates therethrough as in the case of normal percolation under atmosphere pressure.

In the meantime, the water in the boiler 3 is raised to the desired temperature and, upon reaching this level, the thermostat 6 opens the solenoid valves 7 again and turns off the electric resistor 8. Thus, the previous cycle is repeated, and the elastic pocket 18 moves from the position of FIG. 3 to the position of FIG. 4, by expanding itself until it seals the bowl 11. The pressurized hot water flows through the spout 10 and finds no longer, like on completion of the previous cycle, a compacted charge of coffee to plug the percolator 12, but rather a comparatively soft coffee charge capable of permitting, before becoming compacted again, the passage of pressurized hot water therethrough in optimum conditions.

According to the invention, these cycles are repeated in rapid succession, and in order to fully utilize one charge of coffee 13 and fill a container 15, there are provided, for example, four or five cycles, each cycle being terminated before the charge 13 is so compacted as to stop plug-like the passage of the liquid under pressure. This will be obtained, evidently, by suitably dimensioning the boiler 3 and setting the trigger temperature of the thermostat 6. Thus the control group including the thermostat 6 and valves 7 defines together with the boiler 3 and resistor 8 means for intermittent supply of the pressurized liquid from the boiler 3 to the bowl 11 and for causing automatic repetition of a number of alternate supply and venting cycles for the bowl 11.

According to the invention, the supply and control device not only operates in successive cycles to avoid compacting of the coffee charge, but also, at each cycle, adjusts the pressure of the fluid, water in this case, to fit the type of charge 13 present in the bowl 11. In fact, the control valve 26 is urged, in the direction to close the canalization 21, by the compression spring 27 as well as by the backpressure of the fluid present within the bowl 11, this backpressure depending on the degree of compactness of the charge 13. Hence, the more a charge 13 is formed by fine particles which are more compactable, the greater is the backpressure action on the control valve 26, which then tends to close. The contrary happens when the charge 13 is formed by particles of relatively large size, and thus such as not to impede the flow of pressurized hot water: the larger flow through the charge reduces the backpressure acting on the control valve 26, and the latter allows a larger volume of fluid to flow therethrough.

In any case, the amount of water under pressure allowed to pass through is in a way proportional to the maximum permissible not to compact the charge 13 excessively.

With the handle 33 controlling the operation of the device according to this invention, non-pressurized hot water may be admitted into the bowl 11 even before the operating conditions of FIG. 4 are reached: by rotating the handle 33 against the bias of the coil spring 36, the cam 34 is caused to urge the punch member 37 against the control valve 26 to allow the water to enter the spout 10. This operation may be useful to initially wet the coffee charge 13. Linked to the handle 33, an auxiliary device could be provided to admit liquid from the boiler 3 even when the solenoid valves 7 are closed: this device, not shown for simplicity and well within the ability of the experts in the art, could consist of a direct control of a solenoid valve or of a bypass duct between the boiler 3 and supply duct 2.

Figure 6:
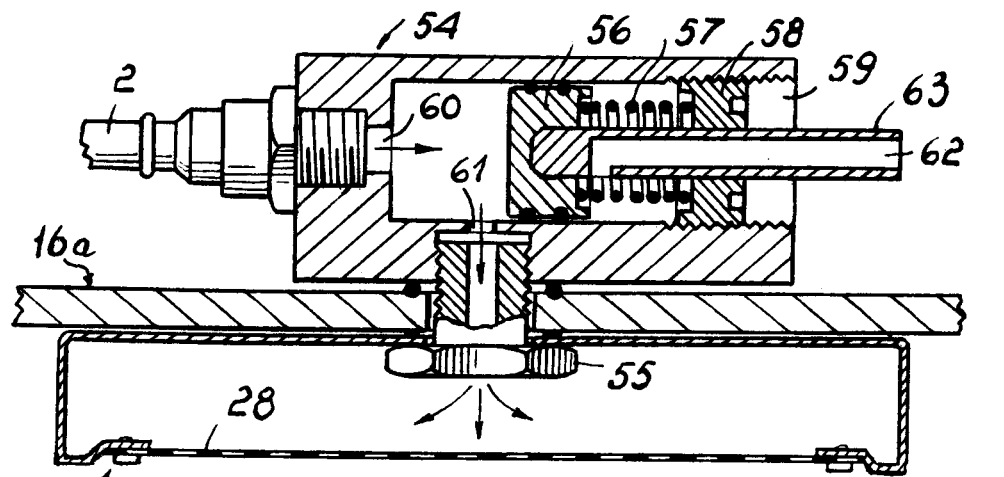
FIGS. 6 and 7 show the device of FIG. 5 at two different operational stages.
Figure 7:
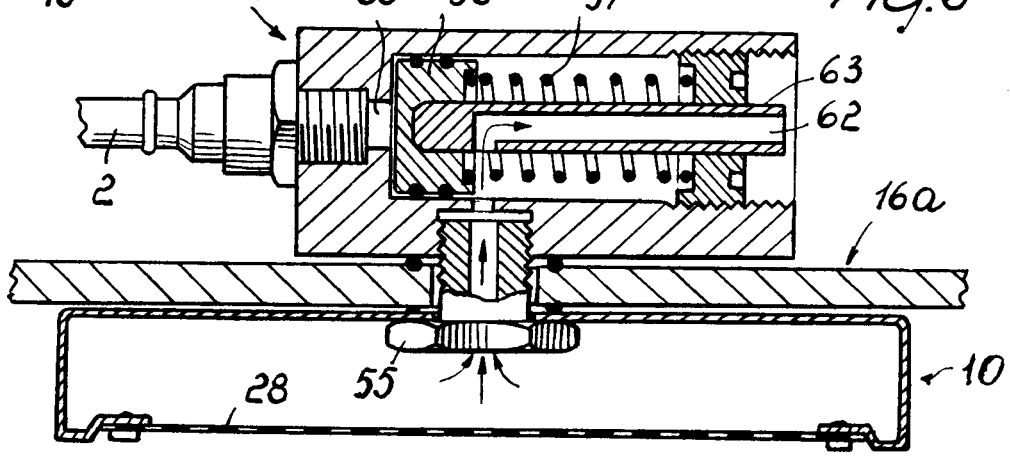
Figure 5:
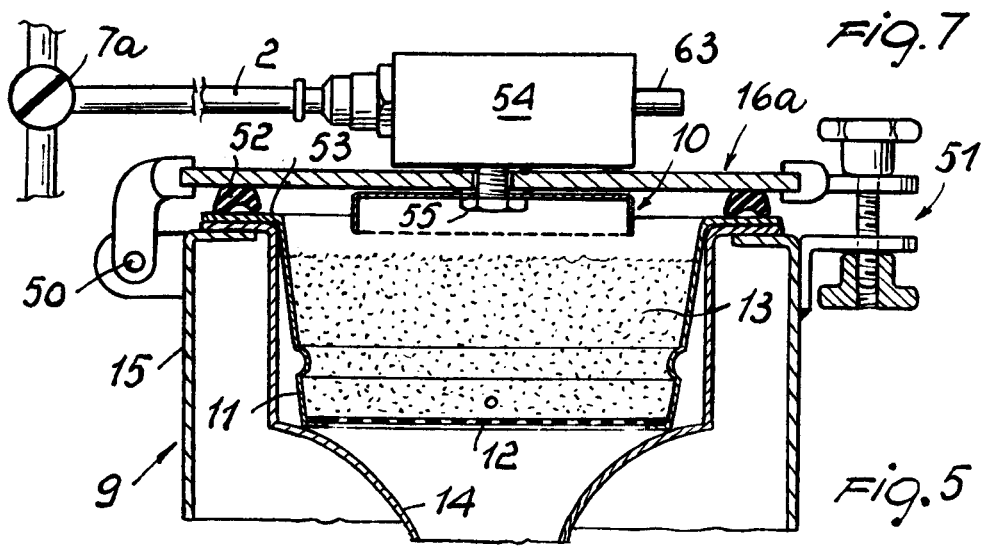
FIG. 5 shows a modification of the device according to the invention.

FIGS. 5, 6 and 7 illustrate a modification of the device according to this invention, which exhibits the same functional characteristics as the preceding embodiment, while comprising the same supply means 1 described above, as well as some of the elements of the percolating assembly 9, which are denoted by the same reference numerals as in the preceding figures.

In detail, as shown in FIG. 5, the percolating assembly 9 comprises once more the spout 10 with the screen 28, the bowl 11 with the percolator or "filter" 12 and coffee charge 13, the funnel 14 and the container 15. The pressurized liquid generating means 1, which remain unaltered, is connected to the percolating assembly 9 of FIG. 5, again through the supply duct 2, in this specific case intercepted by a solenoid valve 7a of the three-way type, also communicating to the surrounding atmosphere. According to this modification, the space between the spout 10 and coffee charge 13 in the bowl 11 is sealed. This is obtained, for example, by providing a cover 16a connected to the container 15 through a hinge member 50 and detachably secured thereto through securing means 51, e.g. of the screw type, and by arranging a seal under said cover. In FIG. 5, the seal comprises an annular member 52 resting, below the cover 16a, on a flange extension 53 of the bowl 11, which does not include the contoured peripheral portion 30.

According to this modification, there are provided control means operative to hold the bowl 11 alternately closed and open, which comprise a control block 54 secured to the cover 16a and connected to the spout 10, e.g. through a bored bolt 55. The latter also locks concurrently the control block 54 and spout 10 to the cover.

Internally of the block 54, a selector is provided which is adapted to alternately connect the bowl 11 to the generating means 1 or the surrounding atmosphere.

More specifically, the control block 54 includes an inner cylindrical chamber or cavity 59 wherein a piston 56 is slidably inserted which is urged by a calibrated spring 57 acting upon a closing washer 58 which can be positioned and fixed by means of a screw connection in the cylindrical cavity 59. The calibrated spring 57 urges the piston 56 toward the end of said cylindrical cavity 59 where is arranged the outlet 60 of the supply duct 2. The space portion defined between the outlet 60 and piston 56 is in practice a variable volume chamber, depending on the position of the piston 56. On the wall of the cavity 59 wherealong the piston 56 slides, a port 61 is provided which communicates with the bored bolt 55 and hence with the spout 10. The distance of this port is selected such that when the piston 56 abuts at its stroke limit under the urge of the calibrated spring 57 (FIG. 7), the port 61 is uncovered. The portion of the cylindrical cavity 59 which is included between the piston 56 and closing washer 58, where the calibrated spring 57 is accomodated, is open to the surrounding outer space through a specially provided passage 62. Advantageously, this passage 62 is formed in the stem 63 of the piston 56, which goes through the closing washer 58: the hollow stem 63 is bored radially and this radial bore communicates with the cavity 59 in the proximity of the piston 56, at a frontal position with respect to the port 61, when the piston 56 is at its stroke limit against the outlet 60.

The modified embodiment just described operates as follows. As the pressurized hot water reaches, by the action of the generating means 1, the percolating assembly 9, it enters, through the outlet 60, the cylindrical cavity 59. The water pressure overcomes the bias of the calibrated spring 57 and produces the withdrawal of the piston 56 until the port 61 is at least partially uncovered. Then the water flows, through the bored bolt 55, into the spout 10 whence it flows through the coffee powder charge (FIG. 6). The tightly closed cover 16 onto the bowl 11 ensures a proper pressure action of the hot water in the bowl itself onto the coffee charge. Once the liquid coffee has formed, this flows through the funnel 14 into the bowl 15, as already discussed hereinabove. As, upon completion of the dispensing step, the water temperature in the boiler 3 drops, the thermostat 6 controls the closing of the solenoid valves 7 and 7a and turns on again the electric resistor 8. Now, the flow of hot water is discontinued and the calibrated spring 57 urges the piston 56 to its stroke limit as shown in FIG. 7. The return stroke of the piston 56 is facilitated by the three-way solenoid valve 7a bleeding the final or end portion of the supply duct 2. Thus, the inside of the bowl 11 is communicated, through the passage 62 in the stem 63, with the surrounding atmosphere. The coffee charge 13, formerly compressed by the water pressing on the percolator or "filter" 12, is then allowed to resume its original position, by swelling and aeration, preliminary to a fresh flow of fluid.

The supply and control device according to this invention fully achieves its objects with either embodiments. In fact, while being simple and compact, it solves completely the technical problem of obtaining a qualitatively effective percolation like in the simple percolation by gravity feed, and quantitatively rapid percolation like in the prior art pressure forced percolations. This owing to the alternate stages of positive and negative pressure applied to the powder material charge, wherefrom the infusion is to be obtained, preventing the material from becoming permanently compacted.

The device according to this invention, while discussed with reference in particular to coffee-making machines, is also suitable for controlling and supplying pressurized fluids in general, and is susceptible to many modifications and variations, in addition to the ones illustrated herein, all of which fall within the scope of the instant inventive concept.

Furthermore, the materials and dimensions used may be any ones to suit individual applicational requirements.

I claim:

1. A device for supplying pressurized liquid, particularly in a coffee-making machine, comprising means for generating said pressurized liquid, a bowl for receiving said pressurized liquid, a charge of powdered material, particularly ground coffee, in said bowl, means for supplying said pressurized liquid to said charge in said bowl, means for holding said bowl air-tight closed during the supply of said pressurized liquid and for venting said bowl to atmosphere when the supply of said pressurized liquid ceases, and means for causing said pressurized liquid to be supplied intermittently from said means for generating said pressurized liquid to said bowl and for causing repetition of a number of alternate supply and venting cycles for said bowl.

2. A device according to claim 1, wherein said means for generating said pressurized liquid comprise a boiler and heating means for said boiler, and said means for causing intermittent supply of said pressurized liquid to said bowl and for causing repetition of a number of alternate supply and venting cycles for said bowl comprise a valve at the outlet of said boiler, a valve at the inlet of said boiler, and a thermostat for controlling said valves on reaching a predetermined temperature of said pressurized liquid to open said valves when said temperature lies in a predetermined range of values and to close said valves when said temperature lies below said range of values.

3. A device according to claim 1, wherein said bowl for receiving said pressurized liquid has at the top at least one opening for venting said bowl to atmosphere, and said means for holding said bowl air-tight closed during supply of said pressurized liquid and for venting said bowl to atmosphere when supply of said pressurized liquid ceases comprise an elastic pocket having an inner space communicating with said means for generating said pressurized liquid, said elastic pocket being arranged in said bowl over said charge of powdered material in the proximity of said at least one opening and being dimensioned such that, when supplied with said pressurized liquid, said elastic pocket expands to close said at least one opening air-tight.

4. A device as claimed in claim 3, further comprising an injector assembly within said pocket, said injector assembly being secured to said pocket at two opposite sides and having an internal canalization, first nozzles communicating therewith and open to said inner space of said elastic pocket, and second nozzles in communication with said canalization and with said bowl.

5. A device according to claim 4, further comprising a control valve for intercepting said internal canalization within said injector assembly between said first nozzles and said second nozzles, and a compression spring acting on said control valve in the opposite direction to the direction of the pressurized liquid flow and calibrated to oppose to said pressurized liquid when at a pressure below a preset working pressure level, to prevent said pressurized liquid from flowing into said bowl before said elastic pocket closes said opening.

6. A device according to claim 5, wherein said second nozzles are arranged in said canalization at a point downstream of said control valve, to permit the pressurized liquid present in said bowl to act concurrently with said compression spring.

7. A device according to claim 5, further comprising a manually operated auxiliary discharge device adapted to open said control valve and allow said pressurized liquid to be admitted to said second nozzles.

8. A device according to claim 3, wherein said bowl includes, in the proximity of said opening, a contoured peripheral portion defining an abutment seat for said elastic pocket in the position of maximum expansion thereof.

9. A device according to claim 1, wherein said bowl for receiving said pressurized liquid has at the top a cover air-tight seated thereon, and said means for holding said bowl air-tight closed during supply of said pressurized liquid and for venting said bowl to atmosphere when supply of said pressurized liquid ceases comprise a control block secured to said cover and having an inner chamber connected to said bowl through said cover and to said means for generating said pressurized liquid, a piston slidable in said inner chamber, a spring in said inner chamber acting on said piston against the flow of said pressurized liquid, a three-way valve between said inner chamber and said means for generating said pressurized liquid, said piston having a hollow stem comprising a radial bore adjacent said piston inside said inner chamber and an outlet outside said inner chamber, said piston being movable between a position in which said bowl is vented to atmosphere through said inner chamber and said hollow stem and a position in which said bowl communicates with said means for generating said pressurized liquid through said inner chamber and said three-way valve, said three-way valve having a communication to atmosphere and being operated to open said communication when said bowl is to be vented to atmosphere.

* * * * *